United States Patent
Sun et al.

(10) Patent No.: US 11,437,617 B2
(45) Date of Patent: Sep. 6, 2022

(54) METAL-DOPED CATHODE ACTIVE MATERIAL FOR SODIUM SECONDARY BATTERY, METHOD FOR MANUFACTURING THE SAME, AND SODIUM SECONDARY BATTERY COMPRISING THE SAME

(71) Applicant: INDUSTRY-UNIVERSITY COOPERATION FOUNDATION HANYANG UNIVERSITY, Seoul (KR)

(72) Inventors: Yang Kook Sun, Seoul (KR); Jang Yeon Hwang, Cheongju-si (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 234 days.

(21) Appl. No.: 16/632,632

(22) PCT Filed: Jul. 20, 2018

(86) PCT No.: PCT/KR2018/008238
§ 371 (c)(1),
(2) Date: Jan. 21, 2020

(87) PCT Pub. No.: WO2019/017736
PCT Pub. Date: Jan. 24, 2019

(65) Prior Publication Data
US 2021/0367234 A1  Nov. 25, 2021

(30) Foreign Application Priority Data
Jul. 21, 2017 (KR) .................. 10-2017-0092973

(51) Int. Cl.
*H01M 4/52* (2010.01)
*H01M 10/054* (2010.01)
*H01M 4/02* (2006.01)

(52) U.S. Cl.
CPC ......... *H01M 4/523* (2013.01); *H01M 10/054* (2013.01); *H01M 2004/028* (2013.01)

(58) Field of Classification Search
None
See application file for complete search history.

(56) References Cited

U.S. PATENT DOCUMENTS

| 9,570,743 B2 | 2/2017 | Sun et al. |
| 2012/0135315 A1 | 5/2012 | Niina et al. |
| 2015/0093644 A1 | 4/2015 | Han et al. |
| 2015/0194672 A1 | 7/2015 | Barker et al. |
| 2015/0357638 A1 | 12/2015 | Sun et al. |
| 2017/0092932 A1 | 3/2017 | Kim |
| 2017/0187039 A1 | 6/2017 | Sun et al. |

FOREIGN PATENT DOCUMENTS

| CN | 103456936 A | | 12/2013 |
| CN | 103606667 | * | 2/2014 |
| CN | 104428256 A | | 3/2015 |
| KR | 10-2012-0028072 A | | 3/2012 |
| KR | 10-2012-0062748 A | | 6/2012 |
| KR | 10-2014-0141799 A | | 12/2014 |
| KR | 10-2015-0038831 A | | 4/2015 |
| KR | 10-2015-0095220 A | | 8/2015 |
| KR | 10-2015-0095242 A | | 8/2015 |
| KR | 10-2016-0010630 A | | 1/2016 |
| KR | 10-2017-0036418 A | | 4/2017 |
| WO | WO 2017/067994 | * | 4/2017 |

OTHER PUBLICATIONS

Machine translation of CN103606667, published on Feb. 26, 2014 (Year: 2014).*
Yue,J.-L., Yin, W.-W., Chao, M.-H., Zulipiya, S., Zhou, Y.-N., Fu, Z.-W.-A quinary layer transition metal oxide of $NaN_{1/4}Co_{1/4}Fe_{1/4}Mn_{1/8}Ti_{1/8}O_2$ as high-rate capability and long-cycle-life cathode material for rechargeable sodium ion batteries, Chem Commun. 2015, 51, 15712-15715 (Year: 2015).*
International Search Report of PCT/KR2018/008238 dated Feb. 15, 2019.

* cited by examiner

*Primary Examiner* — Anca Eoff
(74) *Attorney, Agent, or Firm* — Sughrue Mion, PLLC

(57) ABSTRACT

Other Metals are uniformly doped in a sodium transition metal oxide particle to obtain a cathode active material. As a result, it is possible to improve the battery performance by improving the physical properties of the material itself and stabilizing the structure during the charge/discharge process as well as electrochemical properties.

14 Claims, 16 Drawing Sheets

Particle size: 15-30 nm
Sigma Aldrich

Pristine

TiO₂ 1mol %
(ball milling)

TiO₂ 3mol %
(ball milling)

NCM 622

NCM 622
+Ti 1mol%

NCM 622
+Ti 3mol%

NCM 622
+Ti 5mol%

Pristine $TiO_2$ 1mol %
(ball milling)

Bare

Ti 1mol %

Ti 3mol %

Ti 5mol %

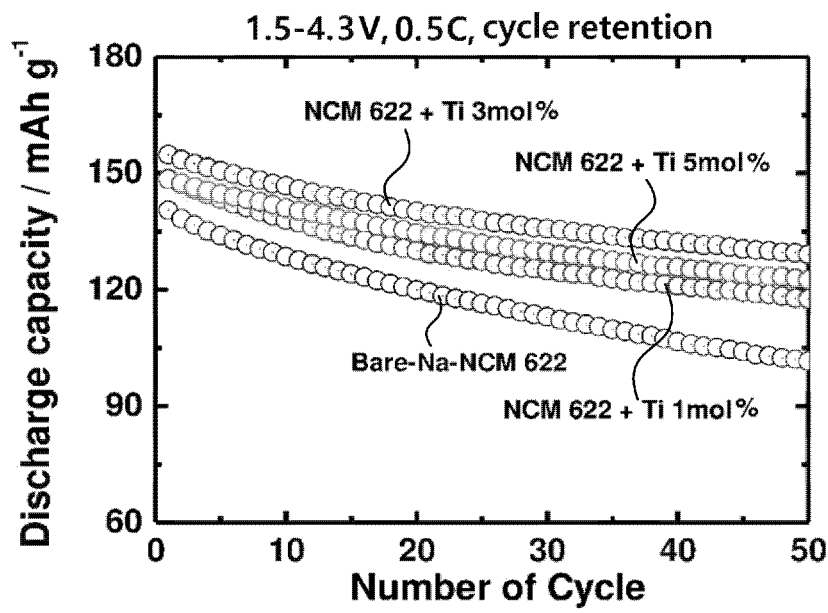
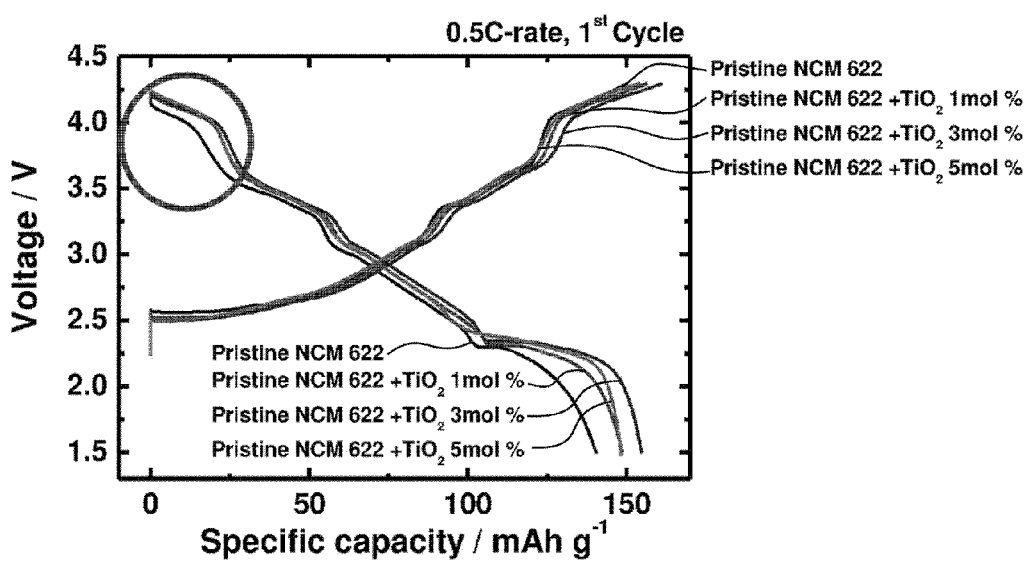

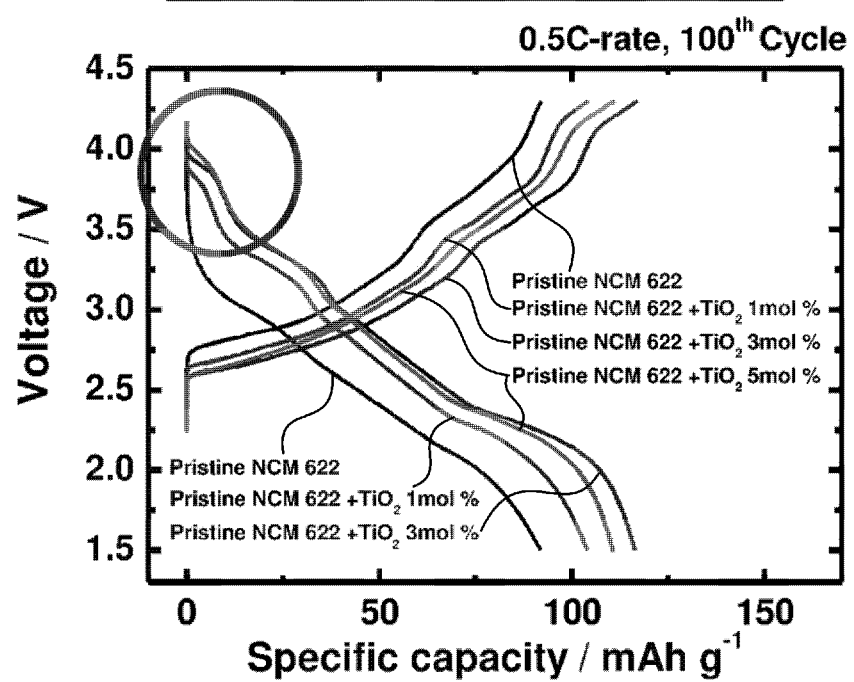

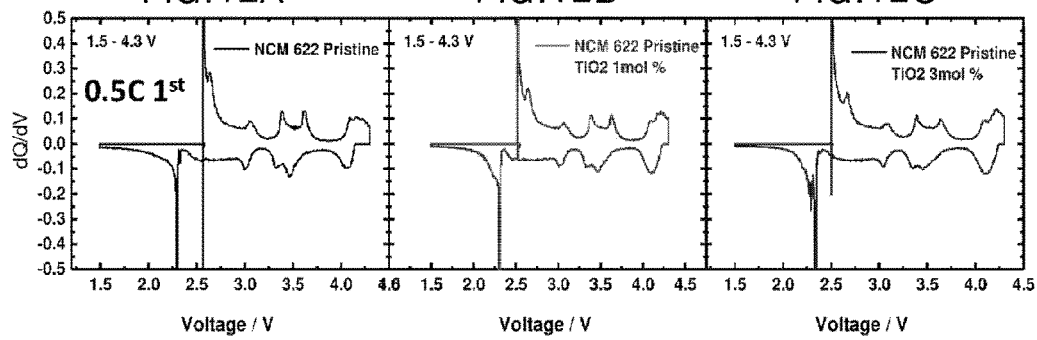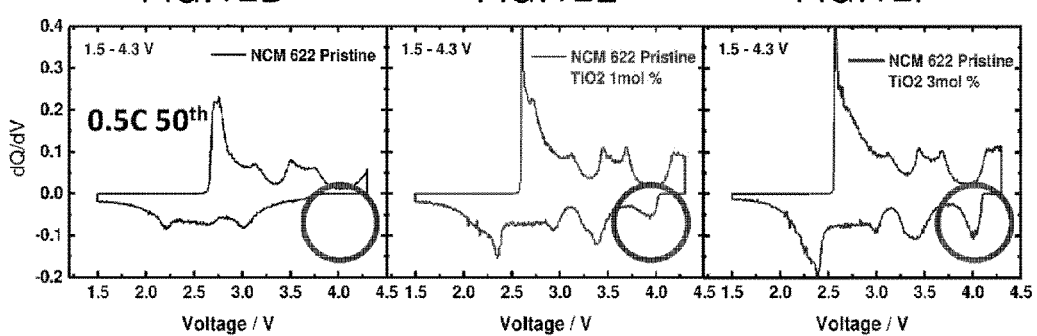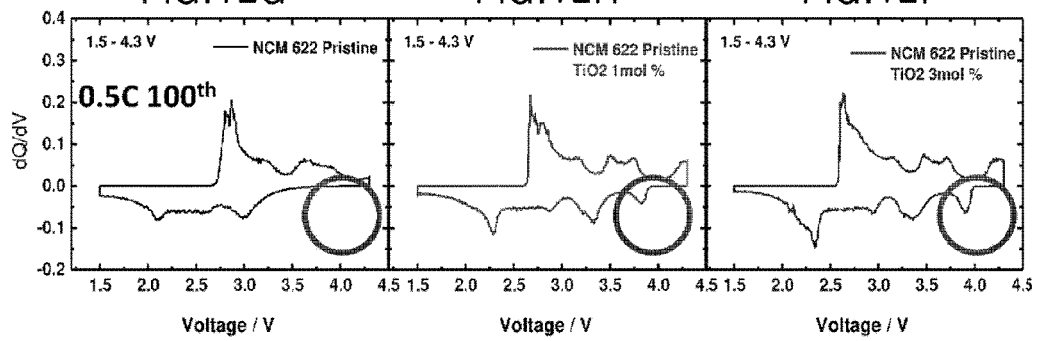

METAL-DOPED CATHODE ACTIVE MATERIAL FOR SODIUM SECONDARY BATTERY, METHOD FOR MANUFACTURING THE SAME, AND SODIUM SECONDARY BATTERY COMPRISING THE SAME

CROSS REFERENCE TO RELATED APPLICATIONS

This application is a National Stage of International Application No. PCT/KR2018/008238 filed Jul. 20, 2018, claiming priority based on Korean Patent Application No. 10-2017-0092973 filed Jul. 21, 2017.

TECHNICAL FIELD

The present invention relates to a secondary battery, and more particularly to a sodium secondary battery.

BACKGROUND ART

Secondary batteries are batteries which can be charged as well as discharged and thus repetitively used. A representative lithium secondary battery of the secondary batteries is operated by the principle in which lithium ions included in a cathode active material of a cathode are moved to an anode through an electrolyte and inserted into a layered structure of a anode active material (charging), and the lithium ions inserted into the layered structure of the anode active material return to the cathode (discharging). Such a lithium secondary battery is now commercially available to be used as a small power supply for a mobile phone, a notebook computer, etc., is also expected to be used as a large power supply for a hybrid car, etc., and thus, demand for the lithium secondary battery is expected to increase.

However, a composite metal oxide mainly used as a cathode active material in a lithium secondary battery contains a rare metal element such as lithium, and there is concern that it cannot meet the demand growth. Accordingly, studies have been made on a sodium secondary battery using sodium, which is rich in supply and low in cost, as a cathode active material. As an example, Korean Patent Laid-Open Publication No. 2012-0133300 discloses $A_xMnPO_4F$ (A=Li or Na, 0<x≤2) as a cathode active material.

However, there is still a need to improve the capacity and cycle characteristics of sodium secondary batteries.

DISCLOSURE

Technical Problem

The problem to be solved by the present invention, to improve the capacity and cycle characteristics of a sodium secondary battery through the improvement of a cathode active material used in the sodium secondary battery.

The technical problems of the present invention are not limited to the above-mentioned technical problems, and other technical problems that are not mentioned will be clearly understood by those skilled in the art from the following description.

Technical Solution

One aspect of the present invention to solve the above technical problem provides a cathode active material for sodium secondary battery. The cathode active material for sodium secondary battery may be represented by the following Formula 4:

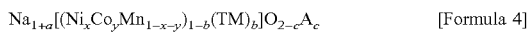

$$Na_{1+a}[(Ni_xCo_yMn_{1-x-y})_{1-b}(TM)_b]O_{2-c}A_c \quad \text{[Formula 4]}$$

In Formula 4, −0.2≤a≤0.2, 0.005≤b≤0.1, 0.1≤x≤0.9, 0.1≤y≤0.9, 0.1≤1−x−y≤0.9, TM is Ti, Zr, Mg, Al, V, W, Mo, Nb, Zn, or Cr, A is N, O, F, or S, and c is 0 to 0.1. In Formula 4 b is 0.009 to 0.06, specifically b may be 0.01 to 0.05, for example, b may be 0.03 to 0.05.

The cathode active material for sodium secondary battery may be represented by the following Formula 5:

$$Na[Ni_xCo_yMn_{1-x-y})_{1-b}Ti_b]O_2 \quad \text{[Formula 5]}$$

In Formula 5, 0.5≤x≤0.9, 0.05≤y≤0.3, and b may be 0.009 to 0.06.

The cathode active material for sodium secondary battery may have a layered structure of O3. The cathode active material for sodium secondary battery may have a form of secondary particle in which primary particles are collected. Here, the TM may be uniformly distributed in the particle. In addition, the cathode active material particles for sodium secondary battery may exhibit a tap density of 1.5 to 1.7 g/ml.

Another aspect of the present invention provides a method of manufacturing a cathode active material for sodium secondary battery. This manufacturing method includes mixing a transition metal oxide precursor and a dopant precursor, which is an oxide of a metal not included in the transition metal oxide precursor, using ball milling to obtain a dopant precursor-transition metal oxide precursor complex. The dopant precursor-transition metal oxide precursor complex and a sodium-containing compound are mixed using ball milling and then heat treated to obtain the cathode active material.

The transition metal oxide precursor and the dopant precursor may be mixed to have a ratio of 0.9 to 6 mol % of the metal of the dopant precursor to the total number of moles of the transition metal in the transition metal oxide precursor and the metal in the dopant precursor. The ratio, specifically, may be 1 to 5 mol %, for example 3 to 5 mol %.

The transition metal oxide precursor may be represented by any one of the following Chemical Formulas 1 to 3:

$$Ni_xCo_yMn_{1-x-y}(OH)_2, \quad \text{[Formula 1]}$$

$$Ni_xCo_yMn_{1-x-y}C_2O_4, \quad \text{[Formula 2]}$$

$$[Ni_xCo_yMn_{1-x-y}]_3O_4 \quad \text{[Formula 3]}$$

In Formulas 1 to 3, 0.1≤x≤0.9, 0.1≤y≤0.9, and 0.1≤1−x−y≤0.9.

The dopant precursor may be $TiO_2$ or $ZrO_2$.

Another aspect of the present invention provides a sodium secondary battery. The sodium secondary battery includes a cathode including a cathode active material represented by Formula 1, an anode containing an anode active material, and an electrolyte disposed between the cathode and the anode.

Advantageous Effects

As described above, according to the present invention, it is possible to improve battery performance, particularly high voltage characteristics and lifespan characteristics by improving the physical properties of the cathode active material itself and stabilizing the structure of the cathode active material in the charging/discharging process as well as electrochemical properties of the cathode active material.

However, effects of the present invention are not limited to the above-mentioned effects, and other effects not mentioned will be clearly understood by those skilled in the art from the following description.

DESCRIPTION OF DRAWINGS

FIG. 10B is a graph showing a change in discharge capacity according to the number of cycles of the half cells according to Half Cell Preparation Examples 1 to 3 and Half Cell Comparative Example.

FIG. 11A is a graph showing charge/discharge characteristics at first cycle under 0.5 C-rate conditions of half cells according to Half Cell Preparation Examples 1 to 3 and Half Cell Comparative Example, and FIG. 11B is a graph showing charge/discharge characteristics at 100th cycle under 0.5 C-rate conditions of half cells according to Half Cell Preparation Examples 1 to 3 and Half Cell Comparative Example.

FIGS. 12A, 12B, 12C, 12D, 12E, 12F, 12G, 12H, and 12I are graphs showing differential capacity with respect to voltage at a first cycle, a 50th cycle, and a $100^{th}$ cycle in 0.5 C-rate condition of half cells according to Half Cell Preparation Examples 1 to 3 and Half Cell Comparative Example.

MODES OF THE INVENTION

Hereinafter, the present invention will be described in further detail with reference to examples. However, the present invention is not limited by the following examples.

Cathode Active Material for Sodium Secondary Battery

Figure 1:
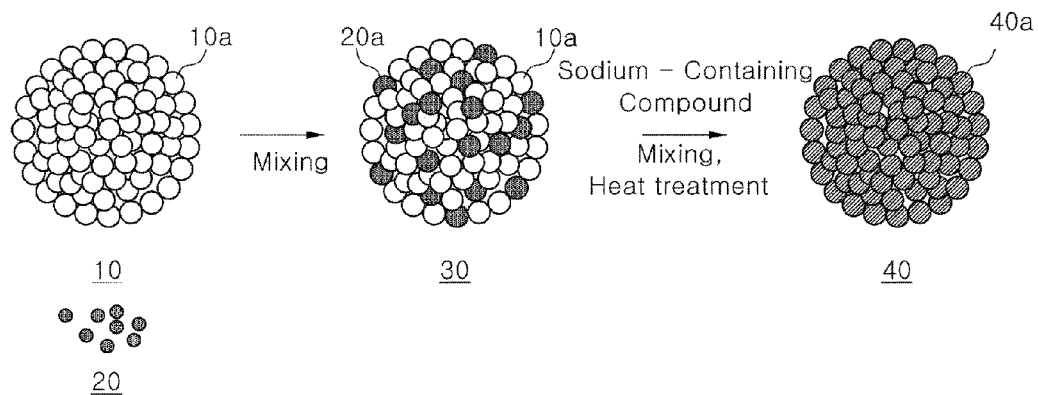
FIG. 1 is a schematic view showing a method of manufacturing a cathode active material according to an embodiment of the present invention.

FIG. 1 is a schematic view showing a method of manufacturing a cathode active material according to an embodiment of the present invention.

Referring to FIG. 1, a transition metal oxide precursor powder may be provided. The transition metal oxide precursor powder may include a plurality of transition metal oxide precursor particles 10. The transition metal oxide precursor may be a compound containing Ni, Co, Mn, or a combination of two or more thereof, and may be represented by any one of the following Chemical Formulas 1-3.

$Ni_xCo_yMn_{1-x-y}(OH)_2$, [Formula 1]

$Ni_xCo_yMn_{1-x-y}C_2O_4$, [Formula 2]

$[Ni_xCo_yMn_{1-x-y}]_3O_4$ [Formula 3]

In Formulas 1 to 3, $0.1 \le x \le 0.9$, $0.1 \le y \le 0.9$, and $0.1 \le 1-x-y \le 0.9$. Specifically, $0.3 \le x \le 0.9$ and $0.05 \le y \le 0.4$. More specifically, $0.5 \le x \le 0.9$ and $0.05 \le y \le 0.3$, for example x may be 0.6 and y may be 0.2.

The transition metal oxide precursor particles 10 may be substantially spherical particles and have a diameter of several to several tens of μm, for example, 8 to 12 μm. In addition, the transition metal oxide precursor particle 10 may be a secondary particle formed by gathering primary particles 10a, and the primary particle 10a may have a width of about 10 to 100 nm and a length of 1 to 1.5 μm and may have an elongated form unlike those shown.

The transition metal oxide precursor particles 10 and dopant precursor particles 20 may be mixed to obtain particles 30 that are dopant precursor-transition metal oxide precursor composite.

The dopant precursor may be an oxide of a metal not included in the transition metal oxide precursor, specifically, an oxide of a Group 2 to 6, Group 12, or Group 13 metal. The dopant precursor may be $TiO_2$, $ZrO_2$, $MgO$, $Al_2O_3$, $V_2O_5$, $WO_3$, $MoO_2$, $NbO_2$, $ZnO_2$, or $CrO_2$. In one embodiment, the dopant precursor may be $TiO_2$ or $ZrO_2$, which is an oxide of a Group 4 metal. The dopant precursor particle may be a substantially spherical nanoparticle having a diameter of nanometers, for example, an average diameter of 10 to 50 nm.

The mixing may be performed using ball milling. Here, the ball milling may be performed at about 80 to 120 rpm for about 4 to 12 hours at room temperature in an air or oxygen atmosphere.

The dopant precursor-transition metal oxide precursor composite particle 30 is a substantially spherical particle having a diameter of several to several tens of μm, for example, 8 to 12 μm. The dopant precursor-transition metal oxide precursor composite particle 30 may be a secondary particle including primary particles 10a of the transition metal oxide precursor and the dopant precursor particles 20a disposed between the primary particles 10a of the transition metal oxide precursor. The dopant precursor particles 20a may be distributed relatively uniformly inside and on the surface of the dopant precursor-transition metal oxide precursor composite particle 30.

The transition metal oxide precursor particles 10 and dopant precursor particles 20 may be mixed to have a specific ratio of the moles of the metal in the dopant precursor particles 20 to the total moles of the transition metal in the transition metal oxide precursor particles 10 and the metal in the dopant precursor particles 20. The ratio may be 0.5 to 10 mol %, specifically 0.9 to 6 mol %, more specifically 0.5 to 7 mol %, more specifically 1 to 5 mol % or 2.5 to 5.5 mol %, for example, 2.5 to 3.5 mol % or 3 to 5 mol %. As an example, when the transition metal oxide precursor particles 10 have a composition of any one of Formulas 1 to 3, and the dopant precursor particles 20 are TiO$_2$ or ZrO$_2$, the dopant precursor particles 20 may be mixed with the transition metal oxide precursor particles 10 at a ratio of 0.5 to 10 mol %, specifically 0.9 to 6 mol %, more specifically 0.5 to 7 mol %, more specifically 1 to 5 mol % or 2.5 to 5.5 mol %, for example, 2.5 to 3.5 mol % or 3 to 5 mol % relative to the total moles of the dopant precursor particles 20 and the transition metal oxide precursor particles 10.

Thereafter, the dopant precursor-transition metal oxide precursor composite particles 30 may be mixed with a sodium-containing compound, for example, sodium salt or sodium oxide, and then heat-treated to prepare cathode active material particles 40. The sodium salt may be one of sodium carbonate, sodium nitrate, sodium acetate, sodium hydroxide, sodium hydroxide hydrate, or a combination thereof. In this case, the mixing may be performed using a ball mill method, and the heat treatment may be performed at an air or oxygen atmosphere at a temperature of about 600 to 700° C.

The cathode active material particles 40 may be substantially spherical particles having a diameter of several to several tens of μm, for example, 8 to 12 μm, and may be secondary particles formed by gathering rod-shaped primary particles 40a. Here, unlike the dopant precursor-transition metal oxide precursor composite particles 30, the primary particles of the transition metal oxide precursor and the dopant precursor particles may not be separately observed. These cathode active material particles 40 may have a tap density of about 1.5 to 1.7 g/ml, specifically about 1.55 to 1.65 g/ml, more specifically about 1.57 to 1.63 g/ml, and may have a specific surface area of about 0.3 to 1.2 m$^2$g$^{-1}$, specifically about 0.5 to 1.1 m$^2$g$^{-1}$, and may have a specific surface area of about 0.004 to 0.007 ccg$^{-1}$. In addition, the cathode active material particles 40 may have a particle strength of about 70 to 130 MPa.

A cathode active material for sodium secondary battery according to an embodiment of the present invention can be represented by the following Formula 4. The cathode active material may be formed using the above manufacturing method.

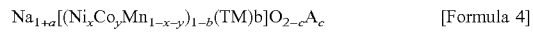

$$Na_{1+a}[(Ni_xCo_yMn_{1-x-y})_{1-b}(TM)b]O_{2-c}A_c \quad \text{[Formula 4]}$$

In Formula 4, −0.2≤a≤0.2, 0.005≤b≤0.1, 0.1≤x≤0.9, 0.1≤y≤0.9, 0.1≤1−x−y≤0.9, TM is Ti, Zr, Mg, Al, V, W, Mo, Nb, Zn, or Cr. A may be N, O, F, or S as an impurity that may be included in the cathode active material manufacturing process, and c may be 0 to 0.1.

Specifically, a may be 1. x and y may satisfy 0.3≤x≤0.9 and 0.05≤y≤0.4. More specifically, 0.5≤x≤0.9 and 0.05≤y≤0.3, for example x may be 0.6 and y may be 0.2.

b may be 0.005 to 0.07, specifically 0.009 to 0.06, more specifically 0.01 to 0.05 or 0.025 to 0.055, for example, 0.025 to 0.035 or 0.03 to 0.05. TM may be Ti or Zr, for example Ti.

As an example, the cathode active material for sodium secondary battery may be represented by the following Formula 5.

$$Na[(Ni_xCo_yMn_{1-x-y})_{1-b}Ti_b]O_2 \quad \text{[Formula 5]}$$

In Formula 5, x, y, b may be as defined in Formula 4, for example, 0.5≤x≤0.9, 0.05≤y≤0.3, and b may be 0.009 to 0.06.

The cathode active material for sodium secondary battery may have a layered structure of O3. In addition, the cathode active material particles having the composition of Formula 4 may be secondary particles formed by gathering rod-shaped primary particles, where TM may be uniformly distributed in the particles. In other words, the content of TM at the center of the particle may be the same as the content of TM at the surface of the particle.

The cathode active material for sodium secondary battery can have improved physical properties such as tap density and particle strength through the doping of the TM, and thus, suppress the phase transition phenomenon or the changes in crystal structure that may occur during the charge and discharge process, thereby preventing the loss of electrochemical characteristics and improving lifetime characteristics and exhibiting excellent discharge capacity even at high voltages.

Sodium Secondary Battery

Cathode

A cathode material can be obtained by mixing a cathode active material, a conductive material, and a binder.

The cathode active material may be formed using the method described above, and may have a composition represented by Formula 4.

The conductive material may be a carbon material such as natural graphite, artificial graphite, cokes, carbon black, carbon nanotubes, or graphene. The conductive material may be contained in an amount of 2 to 15 parts by weight, specifically 8 to 12 parts by weight or 5 to 6 parts by weight, based on 100 parts by weight of the cathode active material. The binder may be a thermoplastic resin, for example, fluorine resin such as polyvinylidene fluoride, polytetrafluoroethylene, ethylene tetrafluoride, vinylidene fluoride copolymer, hexafluoropropylene, and/or polyolefin resin such as polyethylene or polypropylene. The binder may be contained in an amount of 2 to 9 parts by weight, specifically 4 to 7 parts by weight and more specifically 5 to 6 parts by weight, based on 100 parts by weight of the cathode active material.

The cathode material may be formed on a cathode collector to form a cathode. The cathode collector may be a conductive material such as Al, Ni, or stainless steel. To apply the cathode material onto the cathode collector, pressure molding; or a method of preparing a paste using an organic solvent, applying the paste onto the collector, and fixing the paste by pressing may be used. The organic solvent may be an amine-based solvent such as N,N-dimethylaminopropylamine or diethyltriamine; an ether-based solvent such as ethyleneoxide or tetrahydrofuran; a ketone-based solvent such as methylethylketone; an ester-based solvent such as methyl acetate; or a polar aprotic solvent such as dimethylacetamide or N-methyl-2-pyrrolidone. The application of the paste on the cathode collector may be performed by, for example, gravure coating, slit dye coating, knife coating, or spray coating.

Anode

An anode active material may be prepared using a metal, a metal alloy, a metal oxide, a metal fluoride, a metal sulfide, or a carbon material such as natural graphite, artificial graphite, cokes, carbon black, carbon nanotubes, or graphene, in which a intercalation and deintercalation of Na ions or a conversion reaction may occur.

An anode material may be obtained by mixing the anode active material, a conductive material, and a binder. Here, the conductive material may be a carbon material such as natural graphite, artificial graphite, cokes, carbon black, carbon nanotubes, or graphene. The binder may include a thermoplastic resin, for example, a fluoride resin such as polyvinylidene fluoride, polytetrafluoroethylene, tetrafluoroethylene, a vinylidene fluoride-based copolymer, or hexafluoropropylene, and/or a polyolefin resin such as polyethylene or polypropylene.

An anode may be formed by applying the anode material onto the anode collector. The anode collector may be a conductive material such as Al, Ni, or stainless steel. To apply the anode material onto the anode collector, pressure molding; or a method of preparing a paste using an organic solvent, applying the paste onto the collector, and fixing the paste by pressing may be used. The organic solvent may be an amine-based solvent such as N,N-dimethylaminopropylamine, or diethyltriamine; an ether-based solvent such as ethyleneoxide or tetrahydrofuran; a ketone-based solvent such as methylethylketone; an ester-based solvent such as methylacetate; a polar aprotic solvent such as dimethylacetamide or N-methyl-2-pyrrolidone. The application of the paste on the anode collector may be performed by, for example, gravure coating, slit dye coating, knife coating, or spray coating.

Electrolyte

An electrolyte may contain $NaClO_4$, $NaPF_6$, $NaAsF_6$, $NaSbF_6$, $NaBF_4$, $NaCF_3SO_3$, $NaN(SO_2CF_3)_2$, a lower aliphatic carboxylic acid sodium salt, $NaAlCl_4$ or a mixture of two or more thereof. Among them, it is preferable to use a material containing fluorine. Further, the electrolyte may be dissolved in an organic solvent and used as a non-aqueous electrolyte. Examples of the organic solvent include carbonates such as propylene carbonate, ethylene carbonate, dimethyl carbonate, diethyl carbonate, ethyl methyl carbonate, isopropyl methyl carbonate, vinylene carbonate, 4-trifluoromethyl-1,3-dioxolan-2-one, 1,2-di(methoxycarbonyloxy) ethane; ethers such as 1,2-dimethoxyethane, 1,3-dimethoxypropane, pentafluoropropylmethylether, 2,2,3,3-tetrafluoropropyldifluoromethylether, tetrahydrofuran, 2-methyltetrahydrofuran; esters such as methyl formate, methyl acetate and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethylsulfoxide, and 1,3-propanesultone; or an organic solvent in which a fluorine-substituted group is further introduced to one of the organic solvent may be used.

Alternatively, a solid electrolyte may be used. The solid electrolyte may be an organic solid electrolyte such as a polyethylene oxide-based polymer compound, a polymer compound containing at least one of a polyorganosiloxane chain and a polyoxyalkylene chain. A so-called gel type electrolyte in which a non-aqueous electrolyte is supported on the polymer compound may also be used. On the other hand, inorganic solid electrolytes such as $Na_2S$—$SiS_2$, $Na_2S$—$GeS_2$, $NaTi_2(PO_4)_3$, $NaFe_2(PO_4)_3$, $Na_2(SO_4)_3$, $Fe_2(SO_4)_2(PO_4)$, $Fe_2(MoO_4)_3$ may be used. In some cases, the safety of the sodium secondary battery can be enhanced by using these solid electrolytes. Further, the solid electrolyte may serve as a separator to be described later, and in such a case, a separator may not be required.

Separator

A separator may be disposed between the cathode and the anode. Such a separator may be a material having a form of a porous film, a non-woven fabric, or a woven fabric composed of a material such as a polyolefin resin such as polyethylene or polypropylene, a fluorine resin, or a nitrogen-containing aromatic polymer. As long as a mechanical strength is maintained, the thickness of the separator is preferably small for a high volume energy density of a battery and a small internal resistance. The thickness of the separator may be, generally, about 5 to 200 μm, and particularly, 5 to 40 μm.

Method of Manufacturing Sodium Secondary Battery

A secondary battery may be manufactured by forming an electrode group by sequentially stacking the cathode, the separator, and the anode, accommodating the electrode group, which is rolled, if needed, into a battery can, and immersing the electrode group in the electrolyte. On the other hand, a secondary battery may be manufactured by forming an electrode group by stacking the cathode, the solid electrolyte, and the anode, and rolling the electrode group, if needed, and accommodating the electrode group in a battery can.

Hereinafter, exemplary examples are provided to help in understanding the present invention. However, the following examples are merely provided to help in understanding of the present invention, and the present invention is not limited to the following examples.

<Cathode Active Material Preparation Example 1>

$Ni_{0.6}Co_{0.2}Mn_{0.2}(OH)_2$ powder as a transition metal oxide precursor and $TiO_2$ powder as a dopant precursor are mixed through ball milling (22° C., 100 rpm) for 4 to 12 hours in an air atmosphere to obtain dopant precursor-transition metal oxide precursor composite particles. Thereafter, the dopant precursor-transition metal oxide precursor composite particles were mixed with NaOH, which is a sodium salt, by ball milling, and then heat-treated at 670° C. for 24 hours in an air or oxygen atmosphere to form Ti-doped $Na(Ni_{0.6}Co_{0.2}Mn_{0.2})O_2$ as a cathode active material. Here, $TiO_2$ was used as 1 mol % compared to the total moles of $Ni_{0.6}Co_{0.2}Mn_{0.2}(OH)_2$ and $TiO_2$, and NaOH was the same as the total moles of $Ni_{0.6}Co_{0.2}Mn_{0.2}(OH)_2$ and $TiO_2$.

<Cathode Active Material Preparation Example 2>

A cathode active material was manufactured in the same manner as in Cathode Active Material Preparation Example 1, except that $TiO_2$ was used in an amount of 3 mol % based on the total number of moles of $Ni_{0.6}Co_{0.2}Mn_{0.2}(OH)_2$ and $TiO_2$.

<Cathode Active Material Preparation Example 3>

A cathode active material was manufactured in the same manner as in Cathode Active Material Preparation Example 1, except that $TiO_2$ was used in an amount of 5 mol % based on the total number of moles of $Ni_{0.6}Co_{0.2}Mn_{0.2}(OH)_2$ and $TiO_2$.

<Cathode Active Material Comparative Example>

$Na(Ni_{0.6}Co_{0.2}Mn_{0.2})O_2$ as a cathode active material was obtained by mixing through a ball milling at a molar ratio of $Ni_{0.6}Co_{0.2}Mn_{0.2}(OH)_2$ as a transition metal oxide precursor and NaOH as a sodium salt in 1:1 mole ratio, followed by heat treatment at 670° C. for 24 hours.

Figure 2A:
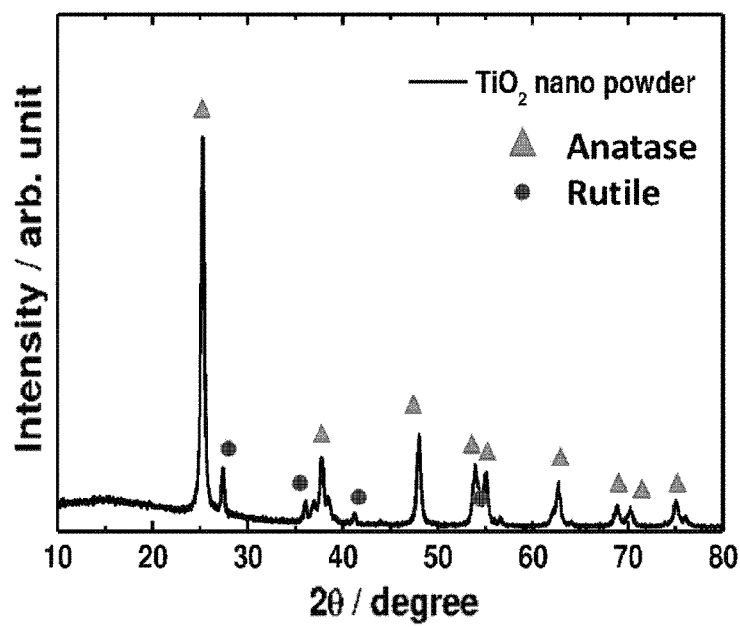
FIGS. 2A and 2B show X-ray diffraction spectroscopy (XRD) patterns and scanning electron microscope (SEM) images of $TiO_2$ nanopowder used in the Cathode Active Material Preparation Examples, respectively.
Figure 2B:
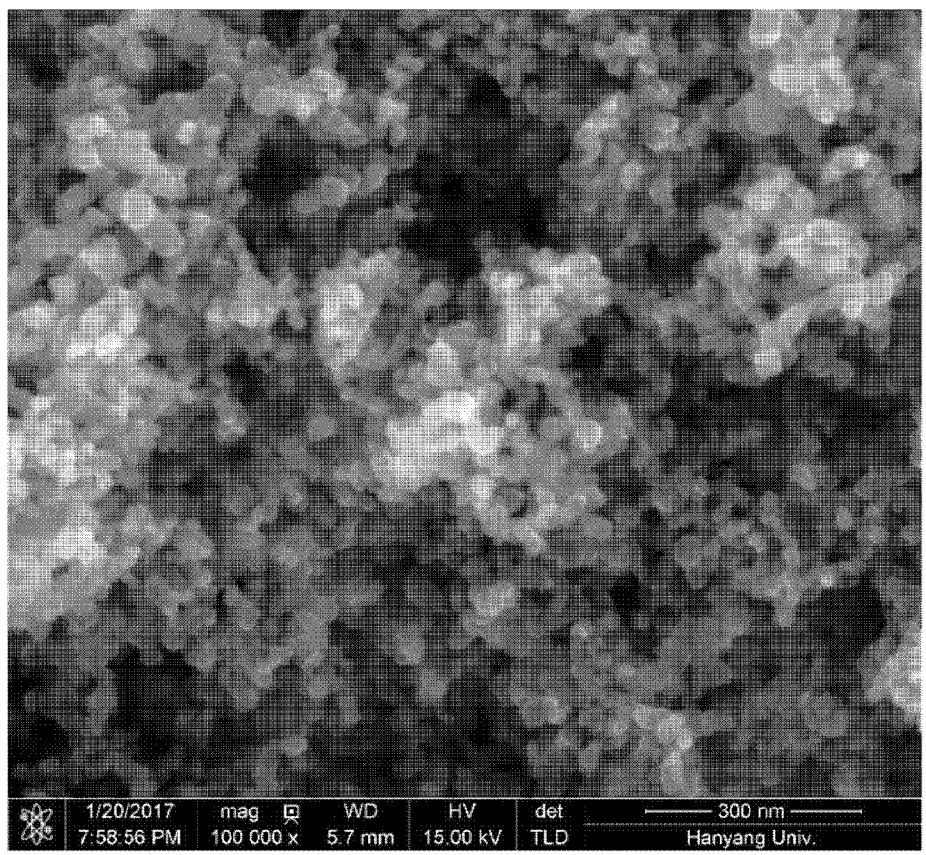

FIGS. 2A and 2B show X-ray diffraction spectroscopy (XRD) patterns and scanning electron microscope (SEM) images of $TiO_2$ nanopowder used in the Cathode Active Material Preparation Examples, respectively.

Referring to FIG. 2A, the $TiO_2$ nanopowder includes crystalline nanoparticles, wherein the crystalline phase is found to be a rutile phase and an anatase phase.

Referring to FIG. 2B, the average particle size of the $TiO_2$ nanopowder was 15 to 30 nm.

Figure 3A:
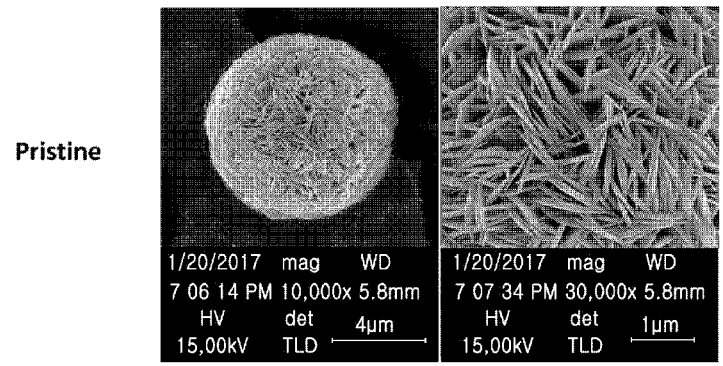
FIGS. 3A, 3B, and 3C show SEM images and ICP (inductively coupled plasma) images of the transition metal oxide precursor particle used in Cathode Active Material Comparative Example, and the dopant precursor-transition metal oxide precursor composite particle obtained during the process of Cathode Active Material Preparation Examples 1 and 2.
Figure 3B:
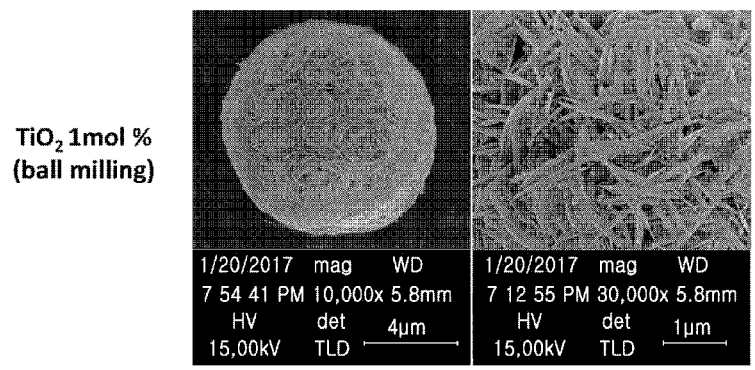
Figure 3C:
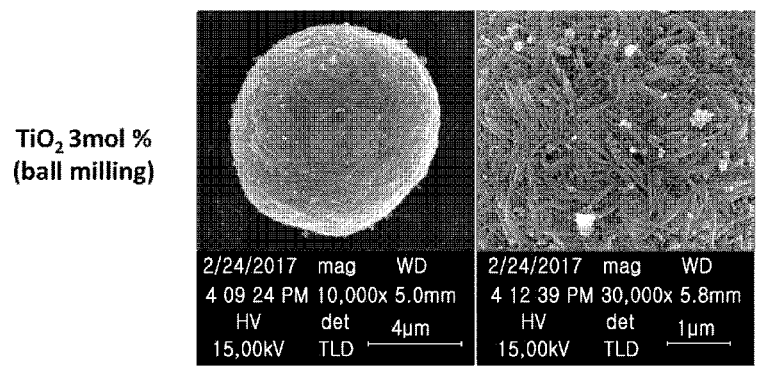
Figure 4A:
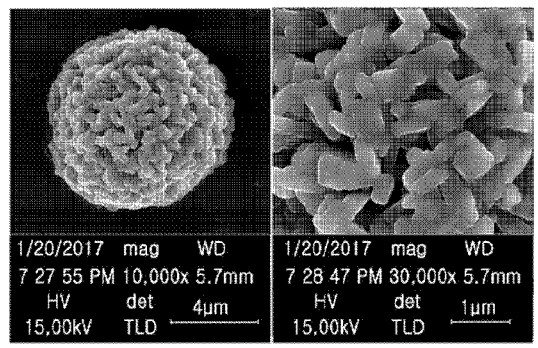
FIGS. 4A, 4B, 4C, and 4D show SEM images and ICP images of cathode active material particles from Cathode Active Material Comparative Example and Cathode Active Material Preparation Examples 1 to 3.
Figure 4B:
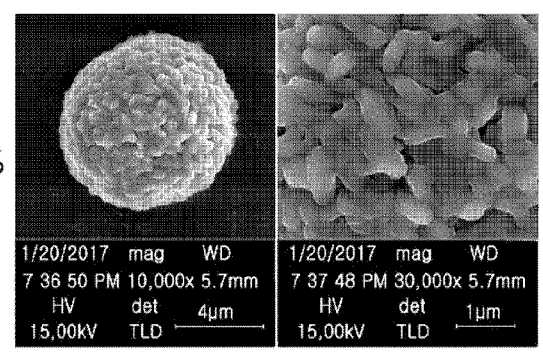
Figure 4C:
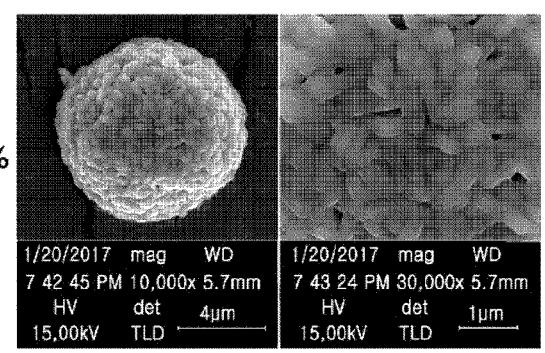
Figure 4D:
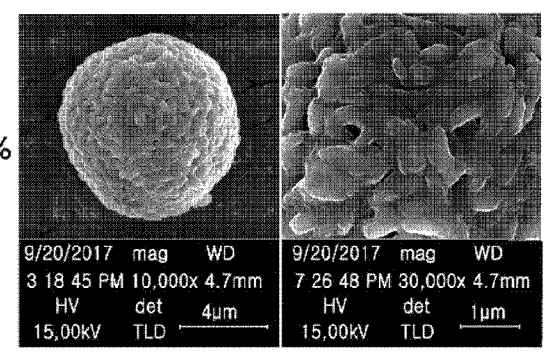

FIGS. 3A, 3B, and 3C show SEM images and ICP (inductively coupled plasma) images of the transition metal oxide precursor particle used in Cathode Active Material Comparative Example, and the dopant precursor-transition metal oxide precursor composite particle obtained during the process of Cathode Active Material Preparation Examples 1 and 2. FIGS. 4A, 4B, 4C, and 4C show SEM images and ICP images of cathode active material particles from Cathode Active Material Comparative Example and Cathode Active Material Preparation Examples 1 to 3.

Referring to FIGS. 3A, 3B, and 3C, it can be seen that the dopant precursor-transition metal oxide precursor composite particles obtained during the processes of Cathode Active Material Preparation Examples 1 and 2 are spherical secondary particles formed by gathering the $Ni_{0.6}Co_{0.2}Mn_{0.2}(OH)_2$ primary particles having an elongated form and the $TiO_2$ primary particles having a rounded shape (see FIGS. 3B and 3C). On the other hand, the transition metal oxide precursor particles according to Cathode Active Material Comparative Example without $TiO_2$ particles only have $Ni_{0.6}Co_{0.2}Mn_{0.2}(OH)_2$ primary particles of the elongated form (see FIG. 3A). Here, it can be seen that the $Ni_{0.6}Co_{0.2}Mn_{0.2}(OH)_2$ primary particles have a width of about 10 to 100 nm and a length of about 1 to 1.2 μm, and the $TiO_2$ primary particles have a similar diameter of about 15 to 30 nm as shown in FIG. 2B. In addition, it can be seen that the dopant precursor-transition metal oxide precursor composite particles are spherical particles having a diameter of about 10 μm.

Meanwhile, referring to FIGS. 4A, 4B, 4C, and 4D, the cathode active material particles are spherical particles having a diameter of about 10 μm, and are identified as secondary particles formed by collecting rod-shaped primary particles. Here, it can be seen that, the $TiO_2$ particles are not identified separately from the primary particles. In addition, it can be seen that as the doping amount of Ti increases, the primary particles are densely arranged in the secondary particle.

Figure 5A:
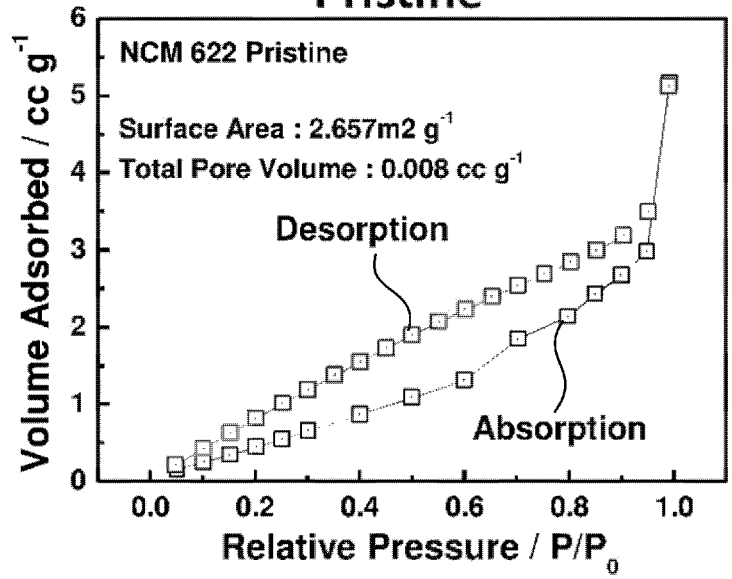
FIGS. 5A, 5B, and 5C are nitrogen isothermal adsorption-desorption graphs of active material particles according to Cathode Active Material Comparative Example and Cathode Active Material Preparation Examples 1 and 2, respectively.
Figure 5B:
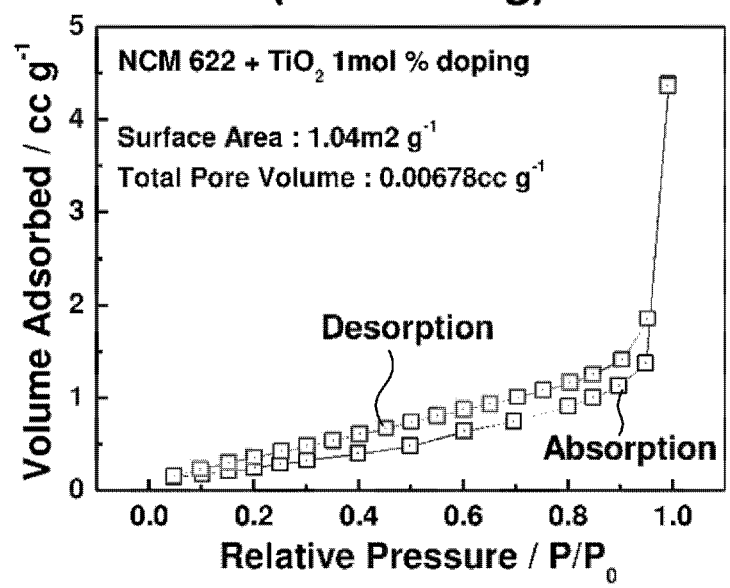
Figure 5C:
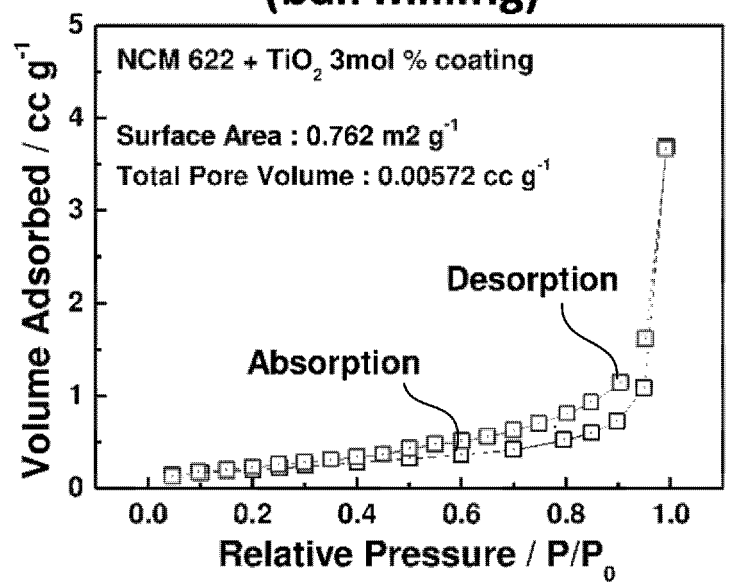

FIGS. 5A, 5B, and 5C are nitrogen isothermal adsorption-desorption graphs of active material particles according to Cathode Active Material Comparative Example and Cathode Active Material Preparation Examples 1 and 2, respectively. In addition, Table 1 shows tap density, surface area, and total pore volume of the active material particles according to Cathode Active Material Comparative Example and Cathode Active Material Preparation Examples 1 to 3. Here, the tap density was measured using a tap density meter through a total of 3000 tappings at a constant speed after filling a sample in a standard graduated cylinder.

TABLE 1

|  | Cathode Active Material Comparative Example | Cathode Active Material Preparation Example 1 (Ti 1 mol %) | Cathode Active Material Preparation Example 2 (Ti 3 mol %) | Cathode Active Material Preparation Example 3 (Ti 5 mol %) |
|---|---|---|---|---|
| tap density (g/ml) | 1.45 | 1.595 | 1.607 | 1.628 |
| surface area ($m^2g^{-1}$) | 2.657 | 1.04 | 0.762 | — |
| total pore volume ($cc\ g^{-1}$) | 0.008 | 0.00678 | 0.00572 | — |

Referring to FIGS. 5A, 5B, 5C and Table 1, in the case of the cathode active materials doped with Ti according to Preparation Examples 1 to 3 compared to the cathode active material in which Ti was not doped according to Comparative Example, the tap density increased, the specific surface area and total pore volume decreased, and as the doping amount of Ti increased, the tap density increased and the specific surface area and total pore volume decreased.

Figure 6A:
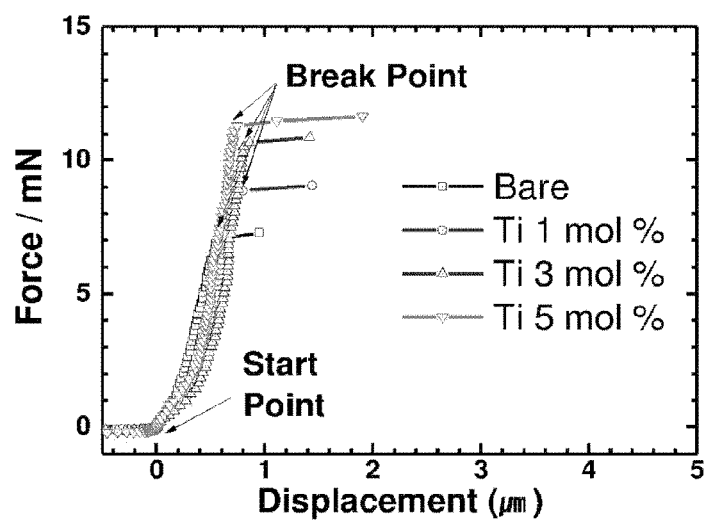
FIG. 6A is a graph illustrating a deformation degree when compressive force is applied to active material particles according to Cathode Active Material Comparative Example and Cathode Active Material Preparation Examples 1 to 3.
Figure 6B:
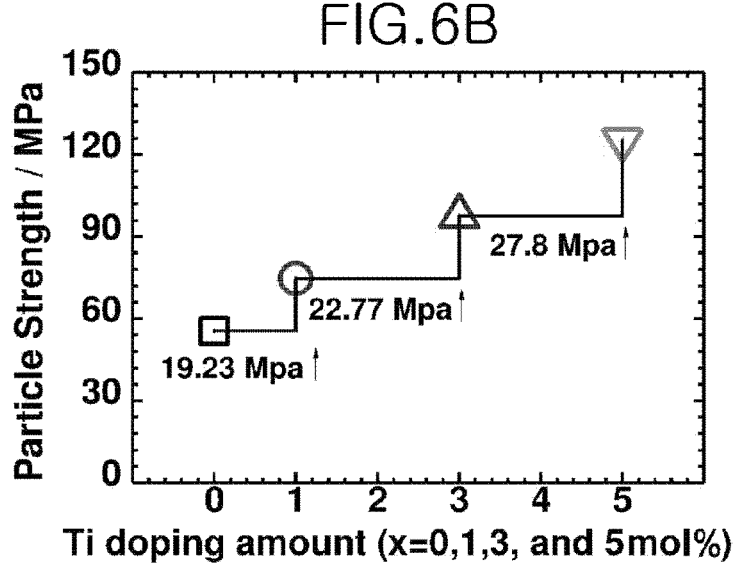
FIG. 6B is a graph illustrating particle strength calculated from FIG. 6A versus the doping concentration of Ti.
Figure 7A:
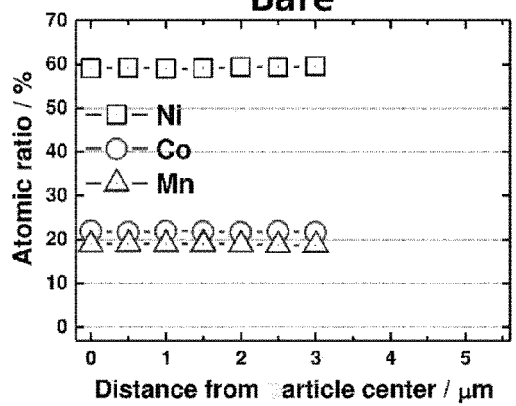
FIGS. 7A, 7B, 7C, and 7D are graphs showing the results of an analysis using an electron probe X-ray micro analyzer (EPMA) on cathode active materials according to Cathode Active Material Comparative Example and Cathode Active Material Preparation Examples 1 to 3, respectively.
Figure 7B:
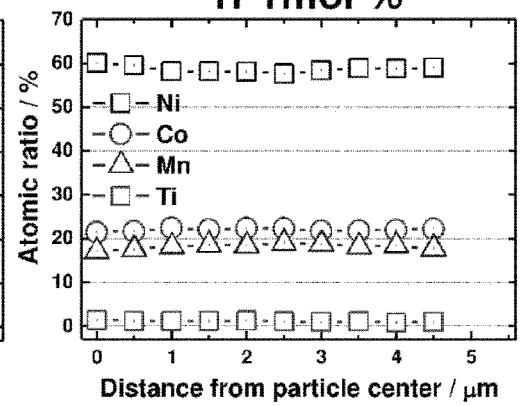
Figure 7C:
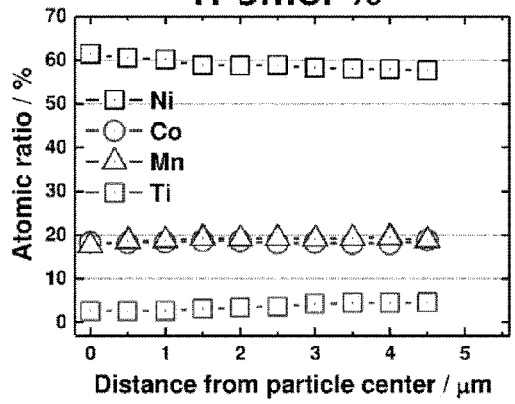
Figure 7D:
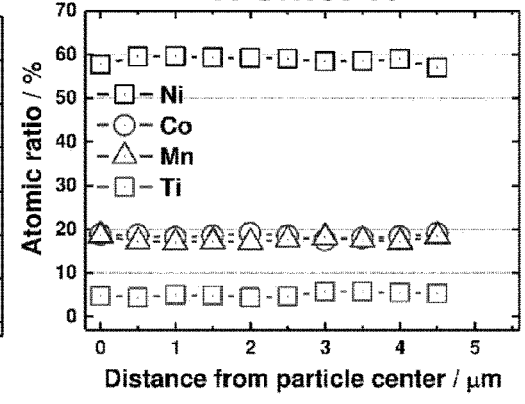
Figure 8A:
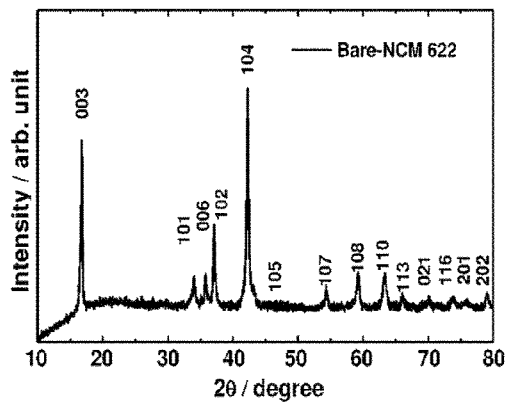
FIGS. 8A, 8B, 8C, and 8D show XRD patterns of the cathode active material particles obtained from Cathode Active Material Comparative Example and Cathode Active Material Preparation Examples 1 to 3, respectively.
Figure 8B:
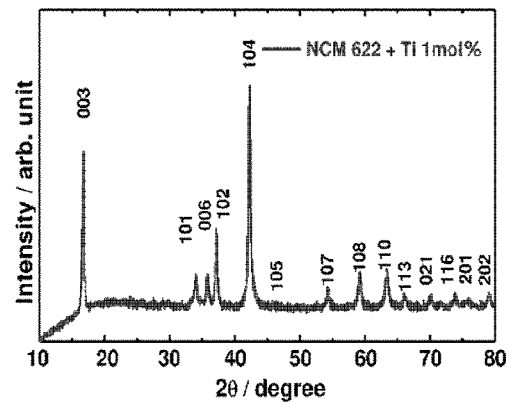
Figure 8C:
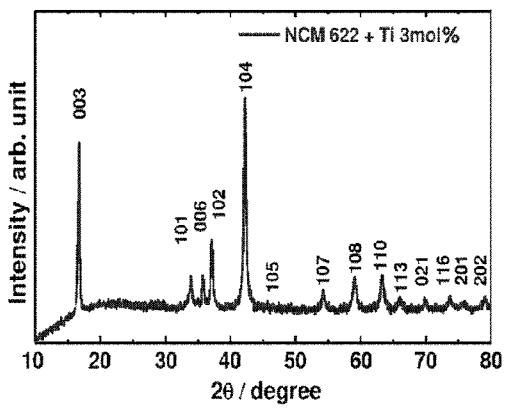
Figure 8D:
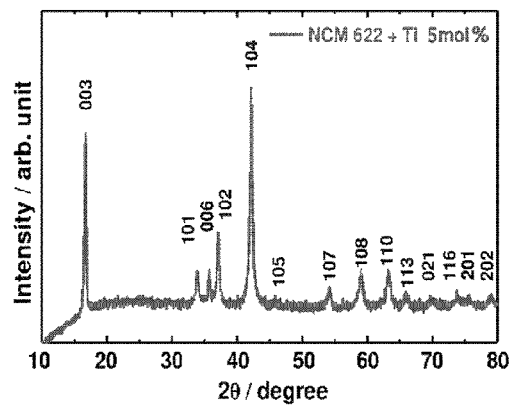

FIG. 6A is a graph illustrating a deformation degree when compressive force is applied to active material particles according to Cathode Active Material Comparative Example and Cathode Active Material Preparation Examples 1 to 3, and FIG. 6B is a graph illustrating particle strength calculated from FIG. 6A versus the doping concentration of Ti.

Referring to FIGS. 6A and 6B, it can be seen that the particle strength is improved as the doping concentration of Ti is increased.

FIGS. 7A, 7B, 7C, and 7D are graphs showing the results of an analysis using an electron probe X-ray micro analyzer (EPMA) on cathode active materials according to Cathode Active Material Comparative Example and Cathode Active Material Preparation Examples 1 to 3, respectively.

Referring to FIGS. 7A, 7B, 7C, and 7D, all of the cathode active material particles according to Cathode Active Material Comparative Example and Cathode Active Material Preparation Examples 1 to 3 appear to have substantially uniform composition from the particle center to the outer edge. In addition, Ti doped in the cathode active material particles according to Cathode Active Material Preparation Examples 1 to 3 can also be seen that almost uniformly doped from the center to the outer edge.

FIGS. 8A, 8B, 8C, and 8D show XRD patterns of the cathode active material particles obtained from Cathode Active Material Comparative Example and Cathode Active Material Preparation Examples 1 to 3, respectively.

Referring to FIGS. 8A, 8B, 8C, and 8D, even when Ti is doped, it appears that there is little change in the crystal phase of the active material.

Half-cell Preparation Examples

Cathode active material obtained from one of Cathode Active Material Preparation Examples 1 to 3 and Cathode Active Material Comparative Example, conductive material (Super-P, KS-6), and binder (Poly vinylidene fluoride) were mixed at a weight ratio of 85:10:5 in an organic solvent (NMP, N-Methyl-2-Pyrrolidone), and then coated on an aluminum current collector and pressed to form a cathode.

Subsequently, a half cell was prepared using metal sodium as a anode, a glass filter as a separator, and non-aqueous electrolyte containing NaPF$_6$ (0.5 M) as electrolyte in a mixed organic solvent of propylene carbonate (PC, 98 vol.%) and fluoroethylene carbonate (FEC, 2 vol. %).

In the following, the half-cell preparation examples using the cathode active materials obtained from Cathode Active Material Preparation Examples 1 to 3 were identified as Half Cell Preparation Examples 1 to 3, respectively, and the half-cell preparation example using the cathode active material obtained from Cathode Active Material Comparative Example was identified as Half Cell Comparative Example.

Figure 9A:
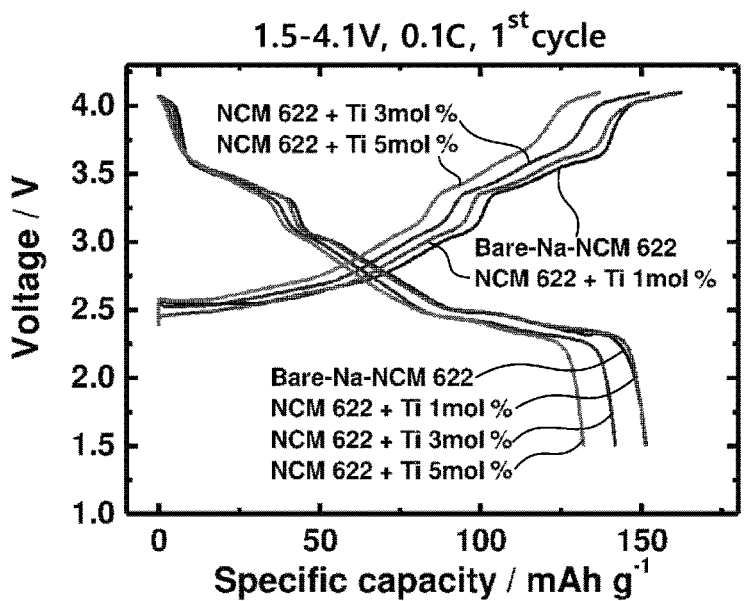
FIG. 9A is a graph showing charge/discharge characteristics of the first cycle of the half cells according to Half Cell Preparation Examples 1 to 3 and Half Cell Comparative Example.
Figure 9B:
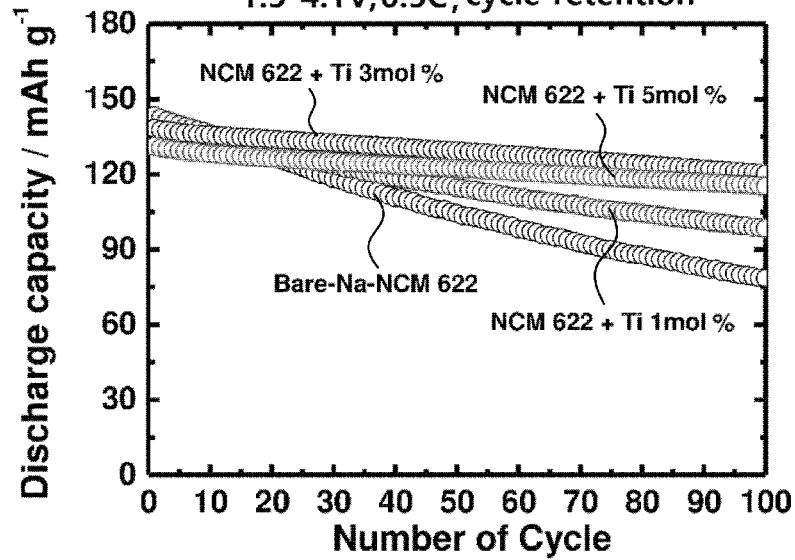
FIG. 9B is a graph showing a change in discharge capacity according to the number of cycles of the half cells according to Half Cell Preparation Examples 1 to 3 and Half Cell Comparative Example.

FIG. 9A is a graph showing charge/discharge characteristics of the first cycle of the half cells according to Half Cell Preparation Examples 1 to 3 and Half Cell Comparative Example, and FIG. 9B is a graph showing a change in discharge capacity according to the number of cycles of the half cells according to Half Cell Preparation Examples 1 to 3 and Half Cell Comparative Example.

In connection with FIG. 9A, charging was performed at 0.1 C to 4.1V, and discharging was performed at 0.1 C to 1.5V. In connection with FIG. 9B, when measuring the change in discharge capacity according to the number of cycles, 100 cycles are proceeded with charging to 4.1V at 0.5 C and discharging to 1.5V at 0.5 C. Table 2 below shows the charge and discharge capacity and efficiency at 0.1 C, discharge capacity at 0.5 C, and cycle retention at 0.5 C.

TABLE 2

| | 0.1 C charge capacity (mAh/g) | 0.1 C discharge capacity (mAh/g) | 1$^{st}$ cycle efficiency (%) | 0.5 C discharge capacity (mAh/g) | 0.5 C cycle retention (%) |
|---|---|---|---|---|---|
| Half Cell Comparative Example | 162.5 | 151.6 | 93.3 | 142.0 | 55.4 (78.6 mAh/g @ 100$^{th}$ cycle) |
| Half Cell Preparation Example 1 (NCM 622, Ti 1 mol % doping) | 161.1 | 151.3 | 93.9 | 143.4 | 68.7 (98.5 mAh/g @ 100$^{th}$ cycle) |
| Half Cell Preparation Example 2 (NCM 622, Ti 3 mol % doping) | 151.6 | 141.8 | 93.5 | 138.4 | 86.8 (120.2 mAh/g @ 100$^{th}$ cycle) |
| Half Cell Preparation Example 3 (NCM 622, Ti 5 mol % doping) | 137.3 | 131.9 | 96.1 | 132.5 | 87.1 (115.4 mAh/g @100$^{th}$ cycle) |

Referring to 9A, 9B, and Table 2, in comparison with the half cell according to Half Cell Comparative Example, the half cells according to Half Cell Preparation Examples 1 to 3 exhibit relatively low discharge capacity in the first cycle at 0.1 C and 0.5 C, but exhibit better discharge capacity after about 20 cycles at 0.5 C, further exhibit significantly improved cycle retention rate at 100 cycles at 0.5 C. From this, it can be seen that the lifespan characteristics of the battery are greatly improved in the case of using the cathode active material doped with Ti of 1 to 5 mol % compared with the case of using the undoped cathode active material.

In addition, it can be seen that, compared to the half cell according to Half Cell Preparation Example 1 using the cathode active material doped with 1 mol % of Ti, the half cells according to Half Cell Preparation Example 2 or 3 using the cathode active material doped with 3 or 5 mol % of Ti show better cycle retention.

Figure 10A:
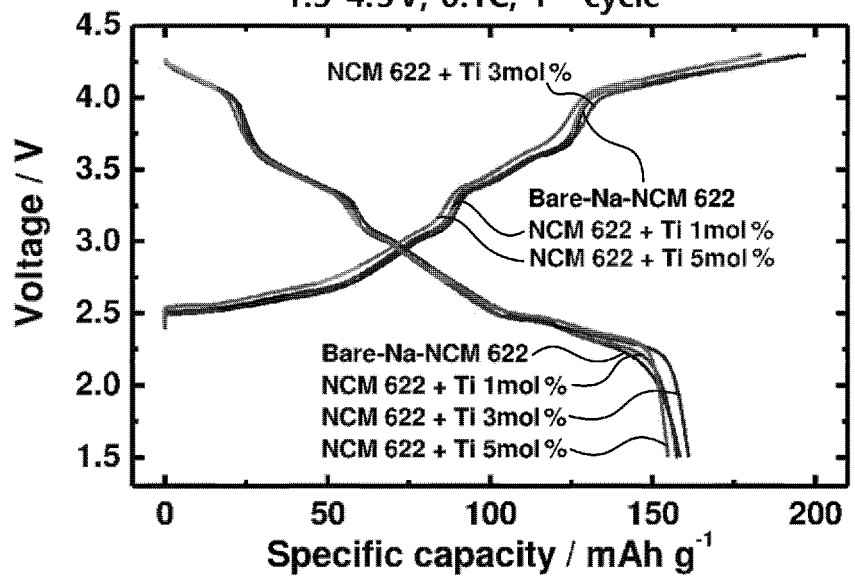
FIG. 10A is a graph showing charge/discharge characteristics of the first cycle of the half cells according to Half Cell Preparation Examples 1 to 3 and Half Cell Comparative Example.

FIG. 10A is a graph showing charge/discharge characteristics of the first cycle of the half cells according to Half Cell Preparation Examples 1 to 3 and Half Cell Comparative Example, and FIG. 10B is a graph showing a change in discharge capacity according to the number of cycles of the half cells according to Half Cell Preparation Examples 1 to 3 and Half Cell Comparative Example.

In connection with FIG. 10A, charging was performed at 0.1 C to 4.3V, and discharge was performed at 0.1 C to 1.5V. In connection with FIG. 10B, when measuring the change in discharge capacity according to the number of cycles, 100 cycles proceeded with charging to 4.3V at 0.5 C and discharging to 1.5V at 0.5 C. Table 3 below shows charge and discharge capacity and efficiency at 0.1 C, discharge capacity and efficiency at 0.2 C, discharge capacity at 0.5 C, and cycle retention at 0.5 C. This evaluation had a difference in that the maximum charging voltage is 4.3V while maximum charging voltage at the evaluation relating to FIGS. 9A and 9B was 4.1V.

TABLE 3

| | 0.1 C charge capacity (mAh/g) | 0.1 C discharge capacity (mAh/g) | 1$^{st}$ cycle efficiency (%) | 0.5 C discharge capacity (mAh/g) | 0.5 C cycle retention (%) |
|---|---|---|---|---|---|
| Half Cell Comparative Example | 197.2 | 158.3 | 80.3 | 140.5 | 70 (101.6 mAh/g @50$^{th}$ cycle) |
| Half Cell Preparation Example 1 (NCM 622, Ti 1 mol % doping) | 195.0 | 157.6 | 80.8 | 148.7 | 80 (117.6 mAh/g @50$^{th}$ cycle) |
| Half Cell Preparation Example 2 (NCM 622, Ti 3 mol % doping) | 194.9 | 161.1 | 82.6 | 154.8 | 83 (129.1 mAh/g @50$^{th}$ cycle) |
| Half Cell Preparation Example 3 (NCM 622, Ti 5 mol % doping) | 183.2 | 154.8 | 84.4 | 148.5 | 85 (122.5 mAh/g @50$^{th}$ cycle) |

Referring to FIGS. 10A, 10B, 10C, and Table 3, the half cell according to Half Cell Comparative Example and the half cells according to Half Cell Preparation Examples 1 to 3 have relatively similar discharge capacities at the first cycle at 0.1 C. However, it can be seen that, compared to the half cell according to Half Cell Comparative Example, the half cells according to Half Cell Preparation Examples 1 to 3 have improved discharge capacity when the first cycle is operated at 0.2 C or 0.5 C. This result shows that the high voltage capacity characteristics of the battery are improved when using the cathode active material doped with 1 to 5 mol % Ti compared to the case of using the undoped cathode active material considering that when the half cells are operated at a charge voltage of 4.1 V (see FIGS. 9A, 9B, and Table 2), compared to the half cell according to Half Cell Comparative Example, the half cells according to Half Cell Preparation Examples 1 to 3 have lower discharge capacity.

In addition, it can be seen that, compared to the half cell according to Half Cell Comparative Example, the half cells according to the Half Cell Preparation Examples 1 to 3 show greatly improved cycle retention rate when 100 cycles are operated at 0.5 C. From this, it can be seen that when using the cathode active material doped with 1 to 5 mol % Ti, compared to the case of using the undoped cathode active material, the life characteristics of the battery is also greatly improved.

In addition, it can be seen that, compared to the half cell according to Half Cell Preparation Example 1 using the cathode active material doped with 1 mol % Ti, the half cells according to Half Cell Preparation Example 2 or 3 using the cathode active material doped with 3 or 5 mol % Ti show better cycle retention.

FIG. 11A is a graph showing charge/discharge characteristics at first cycle under 0.5 C-rate conditions of half cells according to Half Cell Preparation Examples 1 to 3 and Half Cell Comparative Example, and FIG. 11B is a graph showing charge/discharge characteristics at $100^{th}$ cycle under 0.5 C-rate conditions of half cells according to Half Cell Preparation Examples 1 to 3 and Half Cell Comparative Example. In both cases, charging is performed to 4.3V and discharging is performed to 1.5V. FIGS. 12A, 12B, 12C, 12D, 12E, 12F, 12G, 12H, and 12I are graphs showing differential capacity with respect to voltage at a first cycle, a 50th cycle, and a 100th cycle in 0.5 C-rate condition of half cells according to Half Cell Preparation Examples 1 to 3 and Half Cell Comparative Example. In each case, charging is performed to 4.3V and discharging is performed to 1.5V.

Referring to FIGS. 11A, 11B, and 12, the half cell according to Half Cell Comparative Example shows a decrease in discharge capacity as the cycle progresses at 1.5-4.3 V and 0.5 C. It can be assumed that this is due to the fact that sufficient insertion of Na ions into the cathode active material undoped with Ti does not occur.

On the other hand, it can be seen that the half cells according to Half Cell Preparation Examples 1 to 3 having cathode active material doped with Ti show a low decrease in discharge capacity with increased number of the cycles at 1.5-4.3V, 0.5 C conditions. This may be due to the smooth insertion of Na ions into the Ti-doped cathode active material during the discharge process.

Figure 13A:
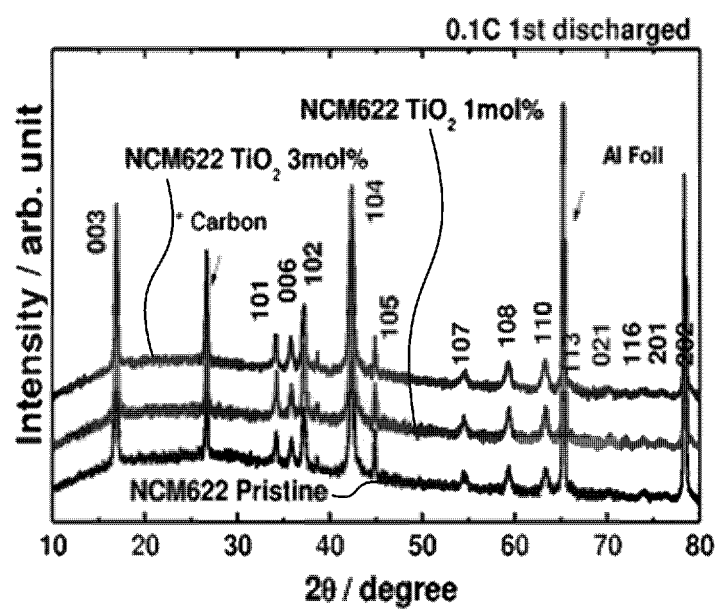
FIG. 13A is an XRD graph of cathode active materials after a first cycle operation at 0.1 C-rate conditions of the half cells according to Half Cell Preparation Examples 1 to 3 and Half Cell Comparative Example.
Figure 13B:
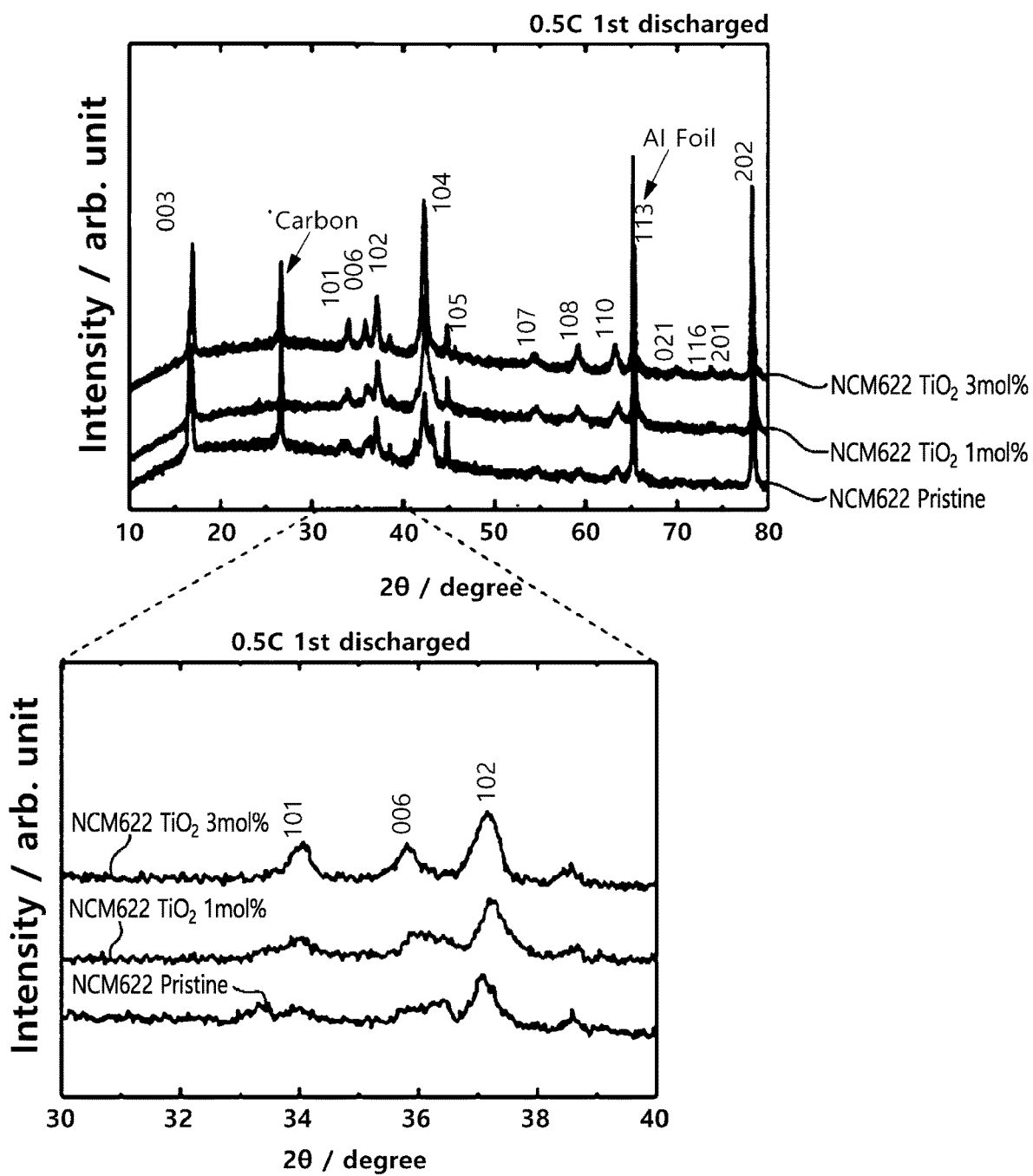
FIG. 13B is an XRD graph of cathode active materials after a first cycle operation at 0.5 C-rate conditions of the half cells according to Half Cell Preparation Examples 1 to 3 and Half Cell Comparative Example.

FIG. 13A is an XRD graph of cathode active materials after a first cycle operation at 0.1 C-rate conditions of the half cells according to Half Cell Preparation Examples 1 to 2 and Half Cell Comparative Example, and FIG. 13B is an XRD graph of cathode active materials after a first cycle operation at 0.5 C-rate conditions of the half cells according to Half Cell Preparation Examples 1 to 2 and Half Cell Comparative Example. In each case, charging was carried out to 4.3V and discharging was carried out to 1.5V.

Referring to 13A and 13B, both the Ti-undoped cathode active material and the Ti-doped cathode active material show little change in crystal structure when the first cycle is performed at 0.1 C. However, in the first cycle at 0.5 C, in case of the Ti-undoped cathode active material, (101), (006), and (102) peaks almost disappear, or the sharpness of them is low, meaning that partial collapse of the crystal structure is occurred. On the other hand, the cathode active material doped with Ti, in particular, the cathode active material doped with 3 mol % of Ti shows good sharpness in all of these peaks and other peaks, and it can be estimated that the change in crystal structure is small.

Figure 14A:
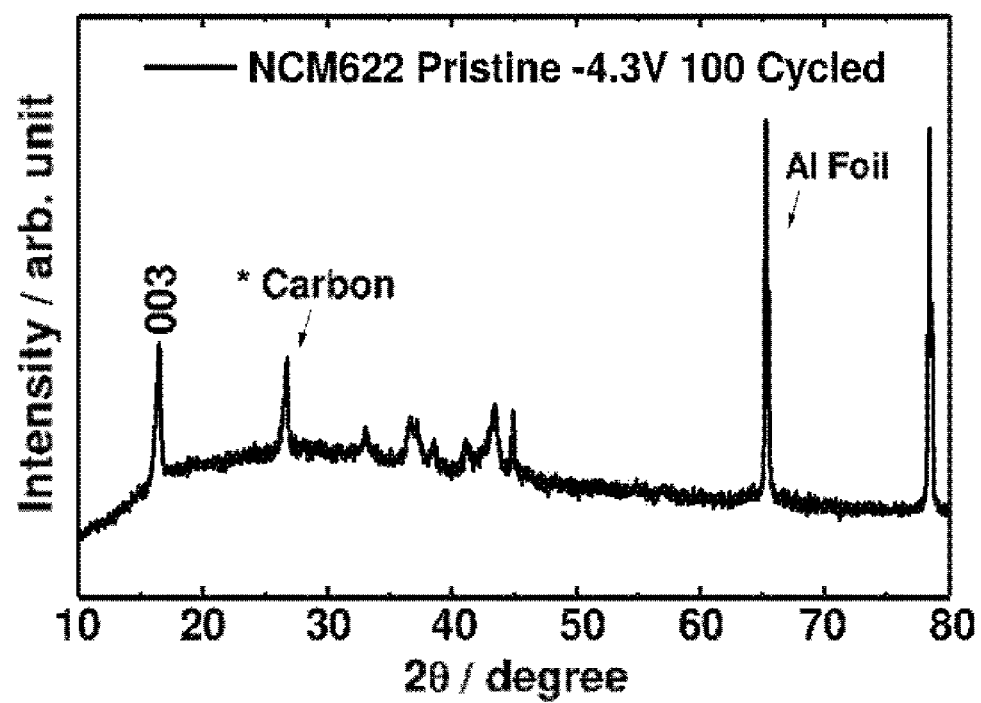
FIG. 14A is an XRD graph of cathode active material after $100^{th}$ cycle operation at 0.5 C-rate conditions of the half cell according to Half Cell Comparative Example.
Figure 14B:
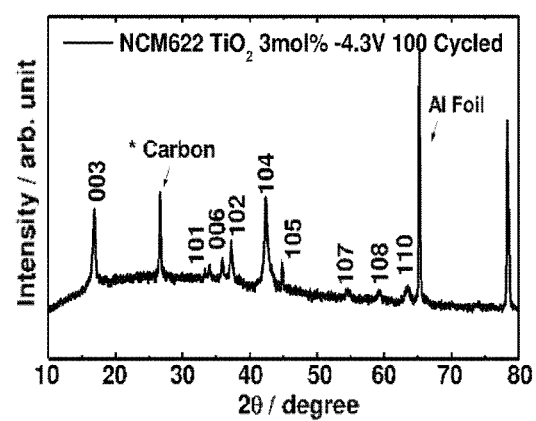
FIG. 14B is an XRD graph of cathode active material after $100^{th}$ cycle operation at 0.5 C-rate conditions of the half cell according to Half Cell Preparation Example 2.

FIG. 14A is an XRD graph of cathode active material after $100^{th}$ cycle operation at 0.5 C-rate conditions of the half cell according to Half Cell Comparative Example, and FIG. 14B is an XRD graph of cathode active material after $100^{th}$ cycle operation at 0.5 C-rate conditions of the half cell according to Half Cell Preparation Example 2. In each case, charging was carried out to 4.3V and discharging was carried out to 1.5V.

Referring to FIG. 14A, after the $100^{th}$ cycle of the Ti-undoped cathode material, most of the XRD peaks disappear, sharpness of the peaks is greatly lowered, or intensity of the peaks is lowered. It means that the crystal structure is almost collapsed.

On the other hand, referring to FIG. 14B, it can be estimated that the cathode active material doped with 3 mol % of Ti shows a good sharpness of almost all peaks even after the $100^{th}$ cycle, and thus there is little change in crystal structure.

The present invention has been described in detail with reference to exemplary embodiments, but the present invention is not limited by the above-described exemplary embodiments, and may be implemented in various modifications and changes by those of ordinary skill in the art within the technical idea and scope of the present invention.

The invention claimed is:

1. A cathode active material for sodium secondary battery represented by the following Formula 4:

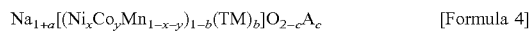

$$Na_{1+a}[(Ni_xCo_yMn_{1-x-y})_{1-b}(TM)_b]O_{2-c}A_c \quad \text{[Formula 4]}$$

in Formula 4, $-0.2 \leq a \leq 0.2$, $0.005 \leq b \leq 0.1$, $0.1 \leq x \leq 0.9$, $0.1 \leq y \leq 0.9$, $0.1 \leq 1-x-y \leq 0.9$, TM is Ti, Zr, Mg, Al, V, W, Mo, Nb, Zn, or Cr, A is N, O, F, or S, and c is 0 to 0.1, wherein the cathode active material has a form of secondary particle in which primary particles are collected, and wherein the TM is uniformly distributed in the secondary particle.

2. The cathode active material of claim 1, wherein b is 0.009 to 0.06.

3. The cathode active material of claim 2, wherein b is 0.01 to 0.05.

4. The cathode active material of claim 3, wherein b is 0.03 to 0.05.

5. The cathode active material of claim 1, wherein the cathode active material for sodium secondary battery is represented by the following Formula 5:

$$Na[(Ni_xCo_yMn_{1-x-y})_{1-b}Ti_b]O_2 \quad \text{[Formula 5]}$$

in Formula 5, $0.5 \leq x \leq 0.9$, $0.05 \leq y \leq 0.3$, and b may be 0.009 to 0.06.

6. The cathode active material of claim 1, wherein the cathode active material for sodium secondary battery has a layered structure of O3.

7. A sodium secondary battery comprising:
a cathode including the cathode active material of claim 1;
an anode containing an anode active material; and
an electrolyte disposed between the cathode and the anode.

8. A cathode active material for sodium secondary battery represented by the following Formula 4:

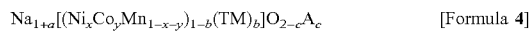

$$Na_{1+a}[(Ni_xCo_yMn_{1-x-y})_{1-b}(TM)_b]O_{2-c}A_c \quad \text{[Formula 4]}$$

in Formula 4, $-0.2 \leq a \leq 0.2$, $0.005 \leq b \leq 0.1$, $0.1 \leq x \leq 0.9$, $0.1 \leq y \leq 0.9$, $0.1 \leq 1-x-y \leq 0.9$, TM is Ti, Zr, Mg, Al, V, W, Mo, Nb, Zn, or Cr, A is N, O, F, or S, and c is 0 to 0.1, wherein the cathode active material has a form of secondary particle in which primary particles are collected, and the cathode active material secondary particle exhibits a tap density of 1.5 to 1.7 g/ml.

9. A method of manufacturing a cathode active material for a sodium secondary battery comprising:

providing transition metal oxide precursor particles each of which is a secondary particle in which primary particles are collected;

mixing the transition metal oxide precursor particles and dopant precursor particles, wherein the dopant precursor particles include an oxide of a dopant metal not included in the transition metal oxide precursor, using ball milling to obtain dopant precursor-transition metal oxide precursor complex particles; and mixing the dopant precursor-transition metal oxide precursor complex particles and a sodium-containing compound using ball milling and then heat treated to obtain the cathode active material particles, wherein each of the cathode active material particles has a form of secondary particle in which primary particles are collected, and wherein the dopant metal is uniformly distributed in the cathode active material particles.

10. The method of claim 9, wherein the transition metal oxide precursor particles and the dopant precursor particles are mixed to have a ratio of 0.9 to 6 mol% of the dopant metal to the total number of moles of the transition metal in the transition metal oxide precursor particles and the dopant metal in the dopant precursor particles.

11. The method of claim 10, wherein the ratio of the dopant metal to the total number of moles of the transition metal in the transition metal oxide precursor particles and the dopant metal in the dopant precursor particles is 1 to 5 mol%.

12. The method of claim 11, wherein the ratio of the dopant metal to the total number of moles of the transition metal in the transition metal oxide precursor particles and the dopant metal in the dopant precursor particles is 3 to 5 mol%.

13. The method of claim 9, wherein the transition metal oxide precursor is represented by any one of the following Formulas 1 to 3:

$$Ni_xCo_yMn_{1-x-y}(OH)_2, \quad \text{[Formula 1]}$$

$$Ni_xCo_yMn_{1-x-y}C_2O_4, \quad \text{[Formula 2]}$$

$$[Ni_xCo_yMn_{1-x-y}]_3O_4 \quad \text{[Formula 3]}$$

in Formulas 1 to 3, $0.1 \leq x \leq 0.9$, $0.1 \leq y \leq 0.9$, and $0.1 \leq 1-x-y \leq 0.9$.

14. The method of claim 9, wherein the dopant precursor is $TiO_2$ or $ZrO_2$.

* * * * *